United States Patent
Campbell et al.

[11] 3,958,995
[45] May 25, 1976

[54] PHOTOGRAPHIC ELEMENTS CONTAINING CROSS-LINKED MORDANTS AND PROCESSES OF PREPARING SAID ELEMENTS

[75] Inventors: Gerald A. Campbell; Hyman Cohen; Lewis R. Hamilton, all of Rochester, N.Y.

[73] Assignee: Eastman Kodak Company, Rochester, N.Y.

[22] Filed: Nov. 19, 1974

[21] Appl. No.: 525,248

[52] U.S. Cl. ............................. 96/84 A; 96/57; 96/77; 427/407
[51] Int. Cl.² ......................................... G03C 1/40
[58] Field of Search ............ 96/84 A, 84 R, 77, 57, 96/56.6, 99, 3, 29 D

[56] References Cited
UNITED STATES PATENTS
3,072,588  1/1963  Vitkuske et al. ............... 260/29.6

OTHER PUBLICATIONS
"Polymers and Photographic Elements Containing Same." Research Disclosure 11623, Dec. 1973.

Primary Examiner—William A. Powell
Assistant Examiner—David A. Simmons
Attorney, Agent, or Firm—A. H. Rosenstein

[57] ABSTRACT

A process for preparing photographic elements comprising a support, a layer containing an acid dye or acid dye precursor and a layer containing a dye mordant composition, said process comprising coating on a support with a substantially aqueous dispersion of a polymer containing units according to the formula:

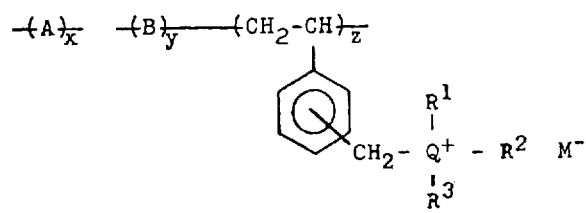

wherein A represents units of an addition-polymerizable monomer containing at least 2 ethylenically-unsaturated groups; B represents units of a copolymerizable ethylenically unsaturated monomer; Q is N or P; $R^1$, $R^2$ and $R^3$ are independently selected from the group consisting of carbocyclic groups and alkyl groups; $M^-$ is an anion and x is from about 0.25 to about 5 mole percent; y is from about 0 to about 90 mole percent and z is from about 10 to about 99 mole percent; and applying a layer containing acid dyes or acid dye precursors. The polymeric mordants are especially useful in diffusion transfer processes.

50 Claims, No Drawings

PHOTOGRAPHIC ELEMENTS CONTAINING CROSS-LINKED MORDANTS AND PROCESSES OF PREPARING SAID ELEMENTS

The present invention relates to novel photographic elements containing polymeric compounds as dye mordants and to processes of preparing such elements.

It is known in the photographic art to use various polymeric materials and mordants in color image transfer elements comprising a support and layer containing a silver halide emulsion to prevent the migration of dyes. Receiving elements containing mordants are described for example in U.S. Pat. Nos. 2,584,080 and 3,770,439.

As described in copending U.S. application Ser. No. 400,778, filed Sept. 26, 1973, by Cohen, King, Ponticello and Burness, certain water-insoluble polymeric mordants have been prepared. These mordants exhibit excellent dye-holding properties and exhibit very little wandering. The disadvantage of using these polymers as mordants is that the polymers must be applied in at least a 40% by weight alcohol solution, generally a methanol-water solution. This presents quite a problem in not only the added cost and expense of removing the alcohol and the pollution problems it presents, but since all other layers in the photographic element are aqueous, if the polymeric mordant was capable of being applied in an aqueous solution, multiple coatings could be formed simultaneously. Using the prior art water-insoluble polymers, multiple coating steps must be carried out to form a photographic element. Further the coating compositions are quite viscous and difficult to apply to a homogeneous, uniform coating. Photographic elements must be uniform and homogeneous to insure quality control of photographic properties.

In order to alleviate some of the problems involved with water-insoluble polymers, it has been proposed to use water-soluble polymers as dye mordants. One problem involving these polymers is that the polymers, being water-soluble, will resolubilize in added gelatin layers in a photographic element and tend to wander. U.S. Pat. No. 3,526,694 describes a process of cross-linking a water soluble polymer with gelatin in the layer so that the mordant becomes immobile and will not wander into other aqueous layers. This process, however, requires delicate balance to achieve an acceptable coated layer as the polymer can harden before coating and the mordanting effects can deteriorate if the coated layer continues to harden after application.

British Pat. No. 1,261,925 describes a process wherein a water soluble vinylbenzyl ammonium chloride-styrene copolymer is used as a dye mordant. This polymer generally exhibits very little wandering and the problem of controlling the hardness of the coated layer is alleviated. However the polymeric mordants described are inferior in dye mordanting properties in that they generally do not hold acid dyes as well as the water insoluble polymers. Further, the viscosity of these polymers, when mixed with gelatin, is so high as to present the coating problems described above leading to non-uniform coatings. In order to improve the mordanting power of the polymer the proportion of styrene can be varied, but in order to achieve an acceptable mordanting level for use in diffusion transfer processes the styrene proportion must be raised to a degree wherein the viscosity is so high as to preclude a homogeneous, uniform application. Thus, the search for a non-wandering mordant polymer having the ability to receive and hold dye strongly and that can be applied in an essentially aqueous solution has been quite extensive.

It is an object of this invention to provide novel dye mordant compositions which can be easily applied to a support and exhibit excellent mordanting properties with respect to acid dyes.

It is an object of this invention to provide new photographic elements containing mordants with excellent dye holding properties.

It is another object of this invention to provide a novel method of preparing photographic elements containing mordants with superior properties using a minimum amount of organic solvent.

It is a further object of this invention to provide a photographic element comprising a support, a silver halide layer and at least one layer comprising a mordant composition.

It is a still further object of this invention to provide a dye image receiving element comprising a support and a dye mordant layer.

Still another object of this invention is to provide an integral negative receiver photographic element comprising a support having a layer containing a polymeric mordant and at least one photosensitive silver halide emulsion layer which has contiguous thereto a dye image-providing material.

These objects are accomplished using a dye mordant composition comprising a water dispersible polymer in particulate form comprising units according to the formula:

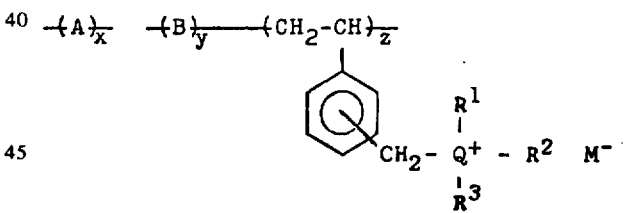

wherein A represents units of an addition polymerizable monomer containing at least two ethylenically unsaturated groups; B represents units of a copolymerizable $\alpha,\beta$-ethylenically unsaturated monomer; Q is N or P; $R^1$, $R^2$ and $R^3$ are independently selected from the group consisting of carbocyclic and alkyl groups; $M^-$ is an anion; x is from about 0.25 to about 5 mole percent; y is from about 0 to about 90 mole percent and z is from about 10 to about 99 mole percent.

Preferred polymers according to this invention comprise units having the formula above wherein A is a repeating unit of an addition polymerizable monomer containing at least 2 ethylenically unsaturated groups, such as vinyl groups generally having the structure

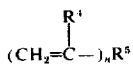

wherein n is an integer greater than 1 and preferably 2 or 3; each $R^4$ is independently selected from hydrogen and methyl and $R^5$ is a linking group comprising 1 or more condensation linkages such as amide, sulfonamide, esters such as sulfonic acid ester, arylene and the like, or a condensation linkage and an organic nucleus such as alkylene, such as methylene, ethylene, trimethylene, arylene, such as phenylene, phenylenedi-(oxycarbonyl), 4,4'-isopropylidene bis(phenyleneoxycarbonyl), methylene(oxycarbonyl), ethylene di(oxycarbonyl), 1,2,3-propanetriyltris(oxycarbonyl), cyclohexylene bis(methyleneoxycarbonyl), methyleneoxymethylene carbonyloxy, ethylene bis(oxyethyleneoxycarbonyl), ethylidyne trioxycarbonyl, and the like. The monomer used must be stable in the presence of strong alkali and must not be highly reactive so that hydrolysis does not occur during copolymerization.

Suitable examples of monomers from which the repeating units (A) are formed are divinylbenzene, allyl acrylate, allyl methacrylate, N-allylmethacrylamide, 4,4'-isopropylidenediphenyl diacrylate, 1,3-butylene diacrylate, 1,3-butylene dimethacrylate, 1,4-cyclohexylenedimethylene dimethacrylate, diethylene glycol dimethacrylate, diisopropylene glycol dimethacrylate, divinyloxymethane, ethylene diacrylate, ethylene dimethacrylate, ethylidene diacrylate, ethylidene dimethacrylate, 1,6-diacrylamidohexane, 1,6-hexamethylene diacrylate, 1,6-hexamethylene dimethacrylate, N,N'-methylenebisacrylamide, neopentyl glycol dimethacrylate, phenylethylene dimethacrylate, tetraethylene glycol dimethacrylate, tetramethylene diacrylate, tetramethylene dimethacrylate, 2,2,2-trichloroethylidene dimethacrylate, triethylene glycol diacrylate, triethylene glycol dimethacrylate, ethylidyne trimethacrylate, propylidene triacrylate, vinyl allyloxyacetate, vinyl methacrylate, 1-vinyloxy-2-allyloxyethane, and the like. Divinylbenzene is a particularly preferred monomer.

B is a unit of a copolymerizable $\alpha,\beta$-ethylenically unsaturated monomer (including two, three or more repeating units) such as ethylene, propylene, 1-butene, isobutene, 2-methylpentene, 2-methylbutene, 1,1,4,4-tetramethylbutadiene, styrene, alpha-methylstyrene; monoethylenically unsaturated esters of aliphatic acids such as vinyl acetate, isopropenyl acetate, allyl acetate, etc.; esters of ethylenically unsaturated mono- or dicarboxylic acids such as methyl methacrylate, ethyl acrylate, diethyl methylenemalonate, etc.; monoethylenically unsaturated compounds such as acrylonitrile, allyl cyanide, and dienes such as butadiene and isoprene. A preferred class of ethylenically unsaturated monomers which may be used to form the ethenic polymers of this invention includes the lower 1-alkenes having from 1 to 6 carbon atoms; styrene, and tetramethylbutadiene and methyl methacrylate.

$R^1$, $R^2$ and $R^3$ are each independently selected from the group consisting of carbocyclic groups such as aryl, aralkyl, and cycloalkyl such as benzyl, phenyl, p-methyl-benzyl, cyclohexyl, cyclopentyl and the like and alkyl preferably containing from 1 to 20 carbon atoms, such s methyl, ethyl, propyl, isobutyl, pentyl, hexyl, heptyl, decyl and the like. In the preferred embodiment $R^1$ and $R^2$ are methyl and $R^3$ is benzyl.

$M^-$ is an anion, i.e., a negative salt forming an ionic radical or atom such as a halide (e.g., bromide, chloride), sulfate, alkyl sulfate, alkane or arene sulfonate (for example, a p-toluenesulfonate), acetate, phosphate, dialkyl phosphate or similar anionic moiety.

Q is N or P and x is from about 0.25 to about 5 mole percent and preferably from about 1.0 to 5.0 mole percent; y is from about 0 to about 90 mole percent and preferably from about 0 to 45 mole percent and z is from about 10 to about 99 mole percent, preferably from about 40 to 99 mole percent.

The polymeric materials according to this invention can be prepared by emulsion polymerizing a vinylbenzyl halide with a poly unsaturated monomer A as described above and an $\alpha,\beta$-ethylenically unsaturated monomer B as described above, generally in the presence of an anionic surfactant such as sodium lauryl sulfate,

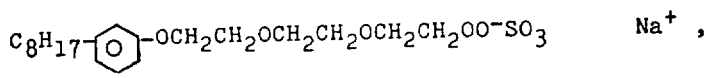

the sodium salt of a sulfated condensate of an alkylphenol and ethylene oxide (Aliphal from General Dyestuff Corp.), and the like and a redox free radical initiator such as potassium persulfate-sodium bisulfite, potassium persulfate-$Fe^{+2}$, $H_2O_2$ - $Fe^{+2}$ and the like. This process is described, for example, in U.S. Pat. No. 3,072,588.

The above polymeric vinybenzyl halide latex can be reacted with a tertiary amine or tertiary phosphine having the structure:

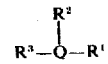

wherein $R^1$, $R^2$, $R^3$ and Q are as described above, generally at temperatures of from about −20°C to about 150°C. This produces a polymeric microgel latex which has a particulate character.

An alternate method of preparing the polymer is to emulsion polymerize an N-vinylbenzyl-N,N-dialkylamine monomer with monomers A and B as described above in the presence of an anionic surfactant and a redox free-radical initiator. The resulting polymer tertiary amine latex is reacted with an alkylating agent having the structure $R^3$-M wherein $R^3$ is as described above and M is a group which can be displaced to yield the anion $M^-$, preferably $M^-$ is a halide such as chloride or an alkyl or aryl sulfonate group. This reaction can take place at temperatures from about −20°C to about 150°C.

In formulating the polymer by the methods described above, hydrolysis of the reactive vinylbenzyl halide residues with the liberation of HCl can produce some recurring units of the structure

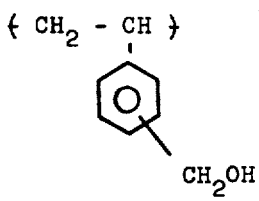

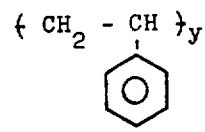

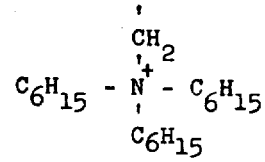

These recurring units are generally present only up to about 5 mole percent of the polymer.

The water-dispersible particulate polymers herein generally have a particle size range of from about $0.04\mu$ to about $0.15\mu$. In the preferred embodiment, a particle size range of from $0.06\mu$ To $0.08\mu$ is used.

The term "water-dispersible polymers" as used throughout the specification and claims describes polymers which appear as a clear or only slightly cloudy solution on visual inspection but which can be seen to be in particulate dispersion form when examined under an electron microscope.

The polymers are prepared quite easily as the entire preparation can take place in one pot. There is no necessity to use large amounts of solvents. The resulting polymer typically is not completely quaternized. Generally, the mole percent quaternization is from about 80 to about 100 percent.

Some polymers which illustrate the mordants according to this invention contain the following units:

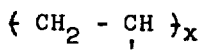

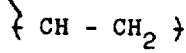

NAME - Poly(divinylbenzene-co-styrene-co-trihexylvinylbenzyl-ammonium chloride)

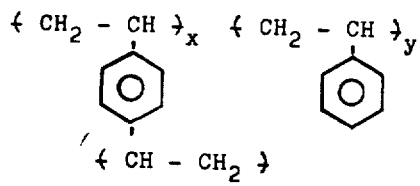

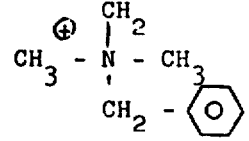

NAME Poly(p-divinylbenzene-co-styrene-co-N-benzyl-N,N-dimethyl-N-vinylbenzenylammonium chloride)

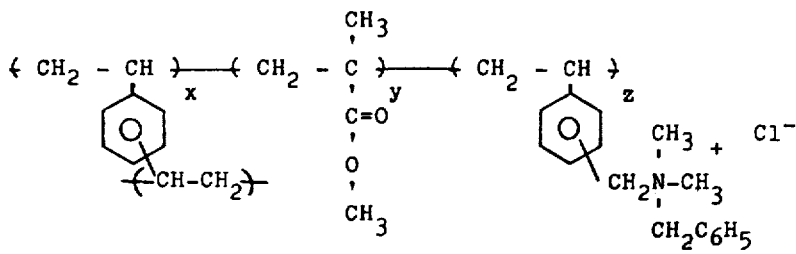

Poly(divinylbenzene-co-methylmethacrylate-co-N,N-dimethyl-N-benzyl-N-vinylbenzyl-ammonium chloride

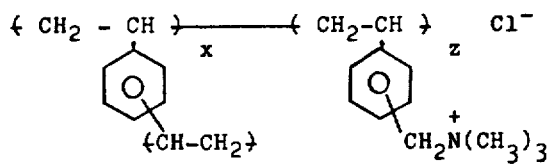

Poly(divinylbenzene-co-N,N,N-trimethyl-N-vinylbenzylammonium chloride
and

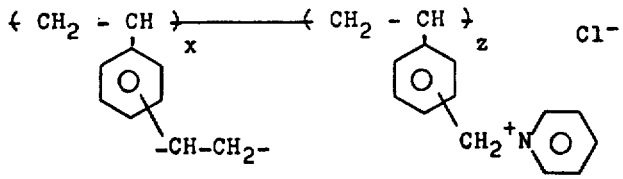

Poly(divinylbenzene-co-N-vinylbenzylpyridinium chloride)

Various addenda can be added to the layer comprising the polymeric mordant such as UV absorbers such as the substituted 2-hydroxy-phenylbenzotriazoles (Tinuvin) and hydroxybenzophenones and the like, and antioxidants such as tertiary butylhydroxyanisole, butylated hydroxy toluene, substituted chromanols and the like.

The dye mordant composition is quite useful in the preparation of photographic elements comprising a support and at least one layer comprising a dye mordant and at least one layer comprising an acid dye or acid dye precursor. The support can comprise any photographic support material such as paper, baryta coated paper, resin coated paper, pigment coated polymeric film, poly(ethylene terephthalate), cellulose acetate, glass, grained aluminum, polycarbonates and the like such as described in *Product Licensing Index*, Vol. 92, Dec. 1971, publication 9232, pages 107–110. The support can consist of any of the above materials or like materials coated with various layers such as timing layers, overcoat layers, acid layers and the like. The support is coated with a substantially aqueous dispersion of the polymer according to the invention and thereafter the layer or layers containing the acid dyes or acid dye precursors are applied.

In a highly preferred embodiment, this invention relates to image-transfer film units comprising:

1. a photosensitive element comprising a support having thereon at least one layer containing a silver halide emulsion having associated therewith an image dye-providing material;
2. an image-receiving layer containing the above-described mordants; and
3. means containing an alkaline processing composition adapted to discharge its contents within said film unit.

By "substantially aqueous" it is meant that the carrier portion of the dispersion contains at least 90% by weight of water, preferably at least 95% by weight of water. The remainder of the carrier in the dispersion can comprise water-miscible organic solvents such as alcohol such as methanol, ethanol, isopropanol, 2-methoxyethanol and the like.

Acid dyes (anionic) and acid dye precursors which are received by the dye mordants of this invention are well known materials to those skilled in the art. Such dyes contain acid groups, for example, carboxylic, sulfonic, ionizable sulfonamido and hydroxy substituted aromatic or heterocyclic groups. Acid dye precursors are described in U.S. application Ser. No. 308,869, filed Nov. 23, 1972. Typical acid dyestuffs which can be received by the dye mordant compositions of this invention are preformed dyes such as described in U.S. application Ser. No. 351,673, filed Apr. 16, 1973; U.S. application Ser. No. 331,727, filed Feb. 5, 1974, U.S. application Ser. No. 439,788, filed Feb. 5, 1974; U.S. Ser. No. 439,790, filed Feb. 5, 1974; U.S. Ser. No. 439,810, filed Feb. 5, 1974 and U.S. Pat. No. 3,443,939 as well as AnthraceneYellow Gr (400% pure Schultz No. 177, Fast Fed S. Conc. (Colour Index 176), Pontacyl Green SN Ex. (Colour Index 737), Acid blue black (Colour Index 246), Acid Magenta O (Colour Index 692), Naphthol Green B Conc. (Colour Index 5), Brilliant Paper Yellow Ex. Conc. 125% (Colour Index 364), Tartrazine (Colour Index 640), Metanil Yellow Conc. (Colour Index 138), Pontacyl Carmine 6B Ex. Conc. (Colour Index 57), Pontacyl Scarlet R Conc. (Colour Index 487) and Pontacyl Rubine R Ex. Conc. (Colour Index 179), and shifted dyes such as described in Busch and Reardon, U.S. Ser. No. 227,113, filed Feb. 17, 1972.

Mordanting amounts of the polymers according to this invention can be employed as such from a substantially aqueous medium or can be incorporated in water-permeable hydrophilic organic colloid binders and the resulting mixture used in the preparation of dye imbibition printing blanks, receiving layers for color transfer processes, such as those described in Land U.S. Pat. No. 3,362,819, Rogers U.S. Pat. No. 2,983,606, Whitmore U.S. Pat. No. 3,227,552 and U.S. Pat. No. 3,227,550, and in antihalation layers such as those described in Jones et al U.S. Pat. No. 3,282,699. Satisfactory colloids which can be used for this purpose include any of the hydrophilic colloids generally employed in the photographic field, including, for example, gelatin, colloidal albumin, polysaccharides, cellulose derivatives, synthetic resins such as polyvinyl compounds, including polyvinyl alcohol derivatives, acrylamide polymers and the like. In general a mordanting amount can be employed in a dye mordanting or dye image-receiving element layer. The amount of dye mordant to be used depends on the amount of dye to be mordanted, the mordanting polymers, the imaging chemistry involved, etc. The amount can be determined easily by one skilled in the art. The dye image-receiving element can comprise a support having the polymeric mordant of this invention thereon. The element may also comprise other layers, such as a polymeric acid layer, and can also include a timing layer as taught in U.S. Pat. No. 2,584,030 and disclosed in U.S. Pat. No. 3,362,819 or a light reflective interlayer comprising a light reflective white pigment such as $TiO_2$ and the polymeric binder in accordance with the teaching of Beavers and Bush U.S. Pat. No. 3,445,228.

The mordanting polymers according to this invention are also especially useful in light-filtering layers, such as in antihalation layers of the type disclosed in Jones and Milton U.S. Pat. No. 3,282,699. Here the light-filtering layer preferably can comprise a hydrophilic colloid and the polymer of this invention. The layer is adapted to contain a dye held or fixed by the mordant.

In certain preferred embodiments, the mordants of this invention are employed in image transfer film units to mordant the image dye. The mordants can generally be used in any image transfer film unit format where initially mobile compounds are used, such as dye developers, or where initially immobile compounds are used, such as compounds which release a diffusible dye as a function of oxidation of the compound. Typical useful image transfer formats are disclosed in U.S. Pat. Nos. 2,543,181; 2,983,606; 3,227,550; 3,227,552; 3,415,645; 3,415,644; 3,415,646 and 3,635,707, Canadian Pat. No. 674,082 and Belgian Pat. Nos. 757,959 and 757,960, both issued Apr. 23, 1971. In highly preferred embodiments, the mordants of this invention are used in the photographic element of an image-transfer film unit which is designed to be processed with a single processing solution, and the resulting positive image is viewed through a transparent support and against an opaque background.

In highly preferred embodiments, the mordants of this invention are useful in color image-transfer film units which comprise:

1. a photosensitive element comprising a support having thereon at least one layer containing a silver halide emulsion having associated therewith an image dye-providing material and preferably three of said layers which contain, respectively, a blue-sensitive silver halide emulsion, a green-sensitive silver halide emulsion and a red-sensitive silver halide emulsion;

2. an image-receiving layer containing the mordants of the above formula which can be located on a separate support and superposed on said support containing said silver halide emulsions layers or, preferably, it can be coated on the same support adjacent to the photosensitive silver halide emulsion layers; and 3. means containing an alkaline processing composition adapted to discharge its contents within said film unit. Where the receiver layer is coated on the same support with the photosensitive silver halide layers, the support is preferably a transparent support, a reflecting layer and opaque layer is preferably positioned between the image-receiving layer and the photosensitive silver halide layer, and the alkaline processing composition preferably contains an opacifying substance such as carbon or a combination of a pH-indicator dye and a pigment such as $TiO_2$ which is discharged into the film unit between a dimensionally stable support or cover sheet and the photosensitive element.

In certain embodiments, the cover sheet can be superposed or adapted to be superposed on the photosensitive element. The mordant layer can be located on the cover sheet. In certain preferred embodiments where the image-receiving layer is located in the photosensitive element, a neutralizing layer is located on the cover sheet.

A means for containing the alkaline processing solution can be any means known in the art for this purpose, including rupturable containers positioned at the point of desired discharge of its contents into the film unit and adapted to be passed between a pair of juxtaposed rollers to effect discharge of the contents into the film unit, frangible containers positioned over or within the photosensitive element, hypodermic syringes, and the like.

The term "image dye-providing material" as used herein is understood to refer to those compounds which either (1) do not require a chemical reaction to form the image dye or (2) undergo reactions encountered in photographic imaging systems to produce an image dye, such as with color couplers, oxichromic compounds and the like. The first class of compounds is generally referred to as preformed image dyes and includes shifted dyes, etc., while the second class of compounds is generally referred to as dye precursors.

The term "initially diffusible" and "initially immobile" as used herein refer to compounds which are incorporated in the photographic element and, upon contact with an alkaline processing solution, are substantially diffusible or substantially immobile, respectively.

The image dye-providing materials, in one embodiment where negative silver halide emulsions are used, can be initially mobile image dye-providing materials such as those used in image-transfer photographic elements. Typical useful, initially mobile image dye-providing materials include dye developers as disclosed in U.S. Pat. Nos. 2,983,606, 3,255,001 and the like; oxichromic developers which undergo chromogenic oxidation to form image dyes as disclosed in U.S. Ser. No. 308,869 filed Nov. 22, 1972; shifted indophenol dye developers as disclosed in Bush and Reardon, U.S. Ser. No. 227,113 filed Feb. 17, 1972; metalized dye developers as disclosed in U.S. Pat. Nos. 3,482,972, 3,544,545, 3,551,406 and 3,563,739; and the like; all of which are incorporated herein by reference.

The image dye-providing material in another preferred embodiment, especially when negative silver halide emulsions are used, is an initially immobile image dye-providing material. Preferably, the initially immobile image dye-providing material is a positive-working immobile photographic compound such as disclosed in Hinshaw and Condit, U.S. Ser. No. 326,628 filed Jan. 26, 1973, which is incorporated herein by reference.

In another embodiment, immobile image dye-providing compounds can be used in association with silver halide emulsions wherein said compounds undergo oxidation followed by hydrolysis to provide an imagewise distribution of a mobile image dye. Compounds of this type can be used with negative emulsions to form positive image records in the exposed photographic element, or they can be used with direct-positive or reversal emulsions to form positive transfer images such as in an image-transfer film unit. Typical useful compounds of this type are disclosed in Canadian Pat. No. 602,607 by Whitmore et al issued Aug. 2, 1960, U.S. Ser. No. 351,673 by Fleckenstein et al and U.S. Ser. No. 351,700 by Fleckenstein, both filed Apr. 16, 1973, U.S. Pat. No. 3,698,897 by Gompf et al, U.S. Pat. Nos. 3,728,113 by Becker et al, 3,725,062 by Anderson et al, 3,227,552 by Whitemore, 3,443,939; 3,443,940 and 3,443,941, and the like, all of which are incorporated herein by reference.

In highly preferred embodiments the mordants of the above formula are used in image transfer film units which also contain an immobile image dye forming material which releases a sulfonamide dye as a function of oxidation. Typical useful materials which release sulfonamide dyes as a function of oxidation followed by hydrophilic cleavage of the material are disclosed in Fleckenstein et al U.S. Ser. No. 351,673 and Fleckenstein U.S. Ser. No. 351,700 which are incorporated herein by reference.

In still other embodiments, the above mordants can be used in image transfer film units containing a layer comprising a negative silver halide emulsion and having an adjacent layer containing physical development nuclei associated with an image dye-providing material. Typical photographic elements of this type are disclosed in U.S. Pat. No. 3,227,551 (col. 6 and 7) and British Pat. No. 904,364 (p. 19), which are incorporated herein by reference.

When a water-permeable colloid is used, the quantity of mordant employed can be varied, depending upon the particular mordant and its chemical characteristics, as well as the dyes to be fixed in the mordanting layer. In general, the quantity of mordant should be at least 10% by weight, based on the weight of hydrophilic colloid. Larger amounts of mordant can be employed in the hydrophilic colloid layers and amounts as high as 50% by weight, based on the weight of the hydrophilic colloid, give quite useful results.

The mordants can also be used for fixing the dyes, and particularly acid dyes, used in the preparation of photographic filter, antihalation and gelatino-silver-halid emulsion layers. Such layers can be coated on conventional photographic supports, such as flexible sheet supports (e.g., cellulose acetate, polyester films, polyvinyl resins, etc.) or paper, glass, etc.

More than one of the mordanting polymers of this invention can be used together, in a single layer or in two or more layers. The mordanting polymers of this invention can also be used in admixture with other mordants in the same layer or in separate layers of the same element.

The following examples further illustrate preferred embodiments of the invention.

EXAMPLE A

Preparation of poly(styrene-co-vinylbenzyl chloride-co-divinylbenzene (mole ratio 4.9:4.9:0.2; Weight ratio 37.7:58.4:2.03)

A reactor was charged with 300 grams of distilled water, degassed with nitrogen gas, heated to 60°C under a nitrogen blanket and 8 ml of 40%

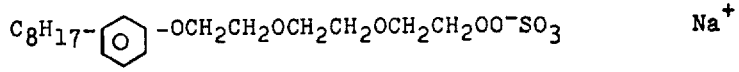

(Triton 770 surfactant) in water, 40.8 gms of styrene, 59.8. gms of vinylbenzyl chloride and 3.8 gms of divinylbenzene were added. A degassed solution of 0.80 gm of potassium persulfate in 17 ml of distilled water and a degassed solution of 0.26 gm of sodium bisulfite in 3 ml of distilled water were added simultaneously and heating and stirring were maintained for 3 hours. The mixture was cooled to 25°C and filtered to produce the latex.

EXAMPLE 1

Preparation of poly(styrene-co-vinylbenzyl chloride-co-N-benzyl-N,N-dimethyl-N-vinylbenzylammonium chloride-co-divinylbenzene (mole ratio 4.90:0.49:4.41:0.2; weight ratio 27.2:4.0:67.4:1.4)

To a mixture of 213.8 gms of a latex of Example A having 24.6% solids, 248 gms of distilled water and 142 gms of isopropanol was added 20.7 gms of dimethylbenzylamine (90 mole % of available quaternization sites) over a half-hour period. Stirring and heating at 60°C were continued for 6 hours and the mixture was cooled to 25°C and filtered to produce a latex having a solution viscosity (Brookfield) at 10% solids of 11 cps.

EXAMPLES 2-7

A series of polymers were prepared as in Example 1 wherein the groups on the quaternary nitrogen atom were varied from methyl to hexyl to form the following polymers with the formulas:

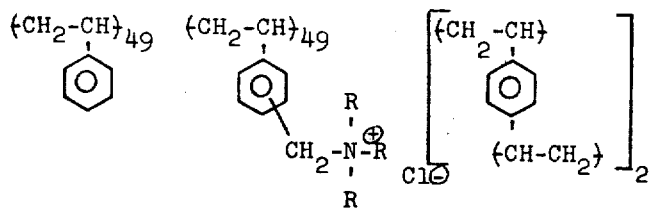

EXAMPLE 2

R = methyl poly(styrene-co-N,N,N-trimethyl-N-vinylbenzylammonium-chloride-co-divinylbenzene)

EXAMPLE 3

R = ethyl poly(styrene-co-N,N,N-triethyl-N-vinylbenzylammonium chloride-co-divinylbenzene)

EXAMPLE 4

R = propyl poly(styrene-co-N,N,N-tri-n-propyl-N-vinylbenzylammonium chloride-co-divinylbenzene)

EXAMPLE 5

R = butyl poly(styrene-co-N,N,N-tributyl-N-vinylbenzylammonium chloride-co-divinylbenzene)

EXAMPLE 6

R = pentyl poly(styrene-co-N,N,N-tripentyl-N-vinylbenzylammonium chloride-co-divinylbenzene)

EXAMPLE 7

R = hexyl poly(styrene-co-N,N,N-trihexyl-N-vinylbenzylammonium chloride-co-divinylbenzene)

EXAMPLES 8-22

A series of polymers were prepared as in Example 1 wherein various proportions of units were formed using varius substituents for R on the quaternary nitrogen atom as shown in Table 1.

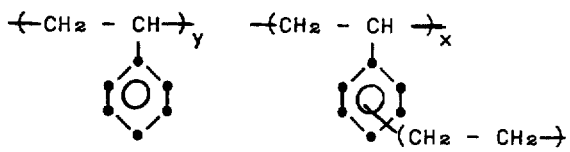

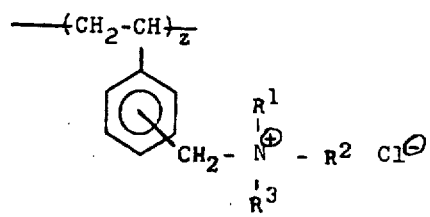

TABLE I

| Examples | $x^a$ | $y^a$ | $z^a$ | $R^1$ | $R^2$ | $R^3$ | C | H | Anal. Found N | Cl |
|---|---|---|---|---|---|---|---|---|---|---|
| 8  | 1    | 49.5  | 49.5  | $CH_3$ | $CH_3$ | $CH_2C_6H_5$ | 77.2 | 8.0 | 3.3[b] | 9.0 |
| 9  | 1    | 59.4  | 39.6  | $CH_3$ | $CH_3$ | $CH_2C_6H_5$ | 77.7 | 7.8 | 2.6[b] | 7.2 |
| 10 | 1    | 69.3  | 29.7  | $CH_3$ | $CH_3$ | $CH_2C_6H_5$ | 80.7 | 7.7 | 2.3[b] | 6.2 |
| 11 | 1    | 79.3  | 19.7  | $CH_3$ | $CH_3$ | $CH_2C_6H_5$ | 83.1 | 7.9 | 2.5[b] | 3.9 |
| 12 | 5    | 47.5  | 47.5  | $CH_3$ | $CH_3$ | $CH_2C_6H_5$ | 77.4 | 7.6 | 3.0[b] | 8.8 |
| 13 | 0.5  | 49.75 | 49.75 | $CH_3$ | $CH_3$ | $CH_2C_6H_5$ | 77.0 | 8.1 | 3.6[b] | 8.5 |
| 14 | 0.25 | 49.9  | 49.9  | $CH_3$ | $CH_3$ | $CH_2C_6H_5$ | 76.9 | 7.8 | 3.1[b] | 8.5 |
| 15 | 1.0  | 39.6  | 59.4  | $CH_3$ | $CH_3$ | $CH_2C_6H_5$ | 75.4 | 7.5 | 3.0[b] | 10.0 |
| 16 | 1.0  | 19.8  | 72.2  | $CH_3$ | $CH_3$ | $CH_2C_6H_5$ | 74.4 | 7.9 | 3.4[b] | 10.4 |
| 17 | 1.0  | 49.5  | 49.5  | $CH_3$ | $CH_3$ | $CH_3$ | 65.5 | 8.2 | 3.7[c] | 9.9 |
| 18 | 0.5  | 49.75 | 49.75 | $CH_3$ | $CH_3$ | $CH_3$ | 69.8 | 8.6 | 4.1[c] | 10.5 |
| 19 | 2.0  | 19.6  | 78.4  | $CH_3$ | $CH_3$ | $CH_3$ | 62.4 | 8.6 | 5.1[c] | 13.7 |

TABLE I-continued

| Examples | x[a] | y[a] | z[a] | R[1] | R[2] | R[3] | Anal. Found C | H | N | Cl |
|---|---|---|---|---|---|---|---|---|---|---|
| 20 | 2.0 | 39.2 | 58.8 | $CH_3$ | $CH_3$ | $CH_3$ | 69.2 | 8.8 | 4.4[c] | 11.7 |
| 21 | 2.0 | 58.8 | 39.2 | $CH_3$ | $CH_3$ | $CH_3$ | 72.1 | 8.6 | 3.4[c] | 8.8 |
| 22 | 2.0 | 65.4 | 32.6 | $CH_3$ | $CH_3$ | $CH_3$ | 76.6 | 8.4 | 3.6[c] | 7.8 |

[a]mole percent of monomer feed
[b]prepolymer reacted with 0.9 equivalents of amine
[c]prepolymer reacted with 1.0 equivalents of amine

EXAMPLES 23–29

A series of polymers was prepared as in Example 1 except that styrene was replaced by the following

| Example | Replacing Monomer | Polymer Formed |
|---|---|---|
| 23 | t-butylstyrene | poly(t-butylstyrene-co-N-benzyl-N,N-dimethyl-N-vinylbenzylammonium chloride-divinylbenzene) |
| 24 | vinyltoluene | poly(vinyltoluene-co-N-benzyl-N,N-dimethyl-N-vinylbenzylammonium chloride-co-divinylbenzene) |
| 25 | vinylbenzyl alcohol | poly(vinylbenzyl alcohol-co-N-benzyl-N,N-dimethyl-N-vinvylbenzylammonium chloride-co-divinylbenzene) |
| 26 | vinylbenzyl acetate | poly(vinylbenzylacetate-co-N-benzyl-N,N-dimethyl-N-vinylbenzylammonium chloride-co-divinylbenzene) |
| 27 | vinylphenylacetonitrile | poly(vinylphenylacetonitrile-co-N-benzyl-N,N-dimethyl-N-vinylbenzyl-ammonium chloride-co-divinylbenzene) |
| 28 | vinylidene chloride | poly(vinylidene chloride-co-N-benzyl-N,N-dimethyl-N-vinylbenzylammonium chloride-co-divinylbenzene) |
| 29 | p-chlorostyrene | poly(p-chlorostyrene-co-N-benzyl-N,N-dimethyl-N-vinylbenzylammonium chloride co-divinylbenzene) |

EXAMPLE 30

Preparation of poly(styrene-co-N,N,N-tributyl benzylphosphonium chloride-divinylbenzene)

To 100 ml of a 23.6% solids latex of Example A was added 136 ml water and 92 ml of isopropanol. To the latex was added 16.6 gms of tributyl phosphine and the mixture was heated at 60°C under nitrogen gas for 3 hours. A clear transparent microgel latex resulted.

EXAMPLES 31–51

A series of dye mordant coating compositions were coated onto support materials and the mordanting properties were tested as follows:

A 7 mil thick poly(ethylene terephthalate) support was coated with an aqueous composition of polymer and gelatin to form a film consisting of 2.2 g/m² of the mordant polymer and 2.2 g/m² of gelatin on the support. An overcoat layer of 54 g/m² gelatin and 0.54 g/m² divinylsulfonylethyl ether hardener and a topcoat of 22 g/m² of $TiO_2$ and 43 g/m² gelatin and 2.2 g/m² of hardener was applied. Various polymers according to the invention were prepared as well as several controls and the elements were tested for dye mass transport and subjected to image smear composition tests as described below.

The dye mass transport was tested by recording the reflection density of a release dye diffusing through the coating. Thus, the element and a fogged redox release coating containing 0.3 g/m² AgBr, 0.18 g/m² 3-5-hydroxy-6-(2'-methyl-sulfonyl-4'-nitrophenylazo)-1-naphthylaminosulfonyl benzenesulfonamido-1-hydroxy-2-[Δ-(2,4-di-tert-amylphenoxy)-n-butyl]-naphthamide and 3.3 g/m² gelatin were laminated together with a 0.056 mm development layer thickness of a standard pod containing 0.85 M KOH and 7.2 g/liter of 4-hydroxymethyl-4-methyl-1-phenyl-3-pyrazolidone. The red reflection dye density was continuously recorded on a recording densitometer and the 10-minute density was taken as final density.

The image smear competition test is designed to measure the strength of the dye mordant complex relative to that of a like mordant which is a strong dye mordant complex but is water-insoluble. The comparative mordant is

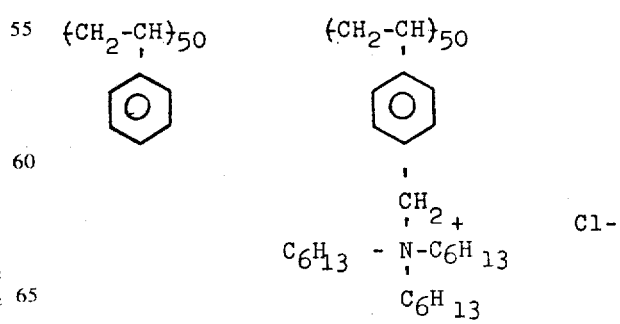

The test is performed by sandwiching a 0.056 mm layer comprising 0.85 M KOH and 0.2 M KBr between 1) a poly(ethylene terephthalate) support coated with a predried comparison mordant and a TiO₂ layer and 2) a poly(ethylene terephthalate) support coated with the mordant coating to be evaluated and a TiO₂ layer. The reflection densities on both sides are read after several days and the ratio of the calculated transmission densities $$\left(\frac{D \text{ evaluated mordant}}{D \text{ comparison mordant}}\right)$$

are determined to obtain the competition value. The competition value of the comparison mordant of course is 1.0. A competition value greater than 0.1 has been found to give minimum acceptable image smear properties with substantive image tranfer dyes. The competition mordant by necessity was applied in an alcohol solution.

The following Table II shows the mass transport density and image smear competition values of polymeric mordants having the formula:

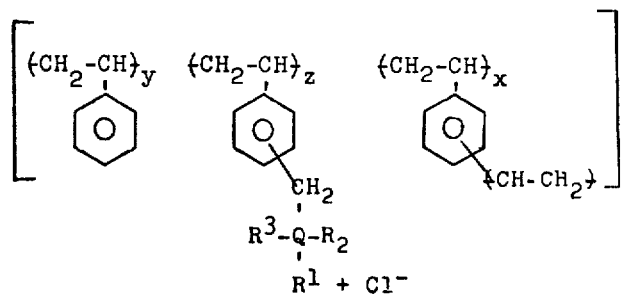

TABLE II

| Example | y | z | x | Q | R¹ | R², R³ | Mass Transport of Reflection Density 20 sec. | Mass Transport of Reflection Density 10 min. | Image Smear Competition Value |
|---|---|---|---|---|---|---|---|---|---|
| Control A | 1 | 1 | 0 | N | C₆H₁₃ | C₆H₁₃ | 0.45 | 1.64 | 1.00 |
| Control B | 1 | 1 | 0 | N | | | 0.20 | 1.38 | 0.02 |
| 31 | 49.5 | 49.5 | 1.0 | N | CH₃ | CH₃ | 0.40 | 1.34 | 0.28 |
| 32 | 65.4 | 32.6 | 2.0 | N | CH₃— | CH₃— | 0.42 | 1.40 | 0.17 |
| 33 | 58.8 | 39.2 | 2.0 | N | CH₃— | CH₃— | 0.40 | 1.26 | 0.21 |
| 34 | 49.8 | 49.8 | 0.5 | N | CH₃— | CH₃— | 0.46 | 1.36 | 0.28 |
| 35 | 49.0 | 49.0 | 2.0 | N | CH₃— | CH₃— | 0.25 | 1.08 | 0.28 |
| 36 | 39.2 | 58.8 | 2.0 | N | CH₃— | CH₃— | 0.56 | 1.47 | 0.37 |
| 37 | 19.6 | 78.4 | 2.0 | N | CH₃— | CH₃— | 0.44 | 1.38 | 0.65 |
| 38 | 49.5 | 49.5 | 1.0 | N | ⌬-CH₂- | CH₃— | 0.56 | 1.31 | 0.51 |
| 39 | 79.3 | 19.7 | 1.0 | N | ⌬-CH₂- | CH₃— | 0.53 | 1.47 | 0.23 |
| 40 | 69.3 | 29.7 | 1.0 | N | ⌬-CH₂- | CH₃— | 0.45 | 1.24 | 0.31 |
| 41 | 59.4 | 39.6 | 1.0 | N | ⌬-CH₂- | CH₃— | 0.40 | 1.34 | 0.36 |
| 42 | 49.9 | 49.9 | 0.25 | N | ⌬-CH₂- | CH₃— | 0.58 | 1.44 | 0.44 |
| 43 | 49.7 | 49.7 | 0.50 | N | ⌬-CH₂- | CH₃— | 0.52 | 1.40 | 0.46 |
| 44 | 49.0 | 49.0 | 2.0 | N | ⌬-CH₂- | CH₃— | 0.46 | 1.33 | 0.51 |
| 45 | 47.5 | 47.5 | 5.0 | N | ⌬-CH₂- | CH₃— | 0.48 | 1.29 | 0.53 |
| 46 | 39.6 | 59.4 | 1.0 | N | ⌬-CH₂- | CH₃— | 0.46 | 1.36 | 0.78 |
| 47 | 19.7 | 79.3 | 1.0 | N | ⌬-CH₂- | CH₃— | 0.52 | 1.21 | 0.72 |
| 48 | | | 5.0 | N | ⌬-CH₂- | CH₃— | | | |

TABLE II-continued

| Example | y | z | x | Q | R¹ | R², R³ | Mass Transport of Reflection Density 20 sec. | 10 min. | Image Smear Competition Value |
|---|---|---|---|---|---|---|---|---|---|
| 49 | 0 | 99 | 1.0 | N | ⌬-CH$_2$- | CH$_3$— | 0.50 | 1.45 | 0.82 |
| 50 | 49.5[1] | 49.5 | 1.0 | N | ⌬-CH$_2$- | CH$_3$— | 0.29 | 1.16 | 0.96 |
| 51 | 49.5 | 49.5 | 1.0 | P | C$_4$H$_9$ | C$_4$H$_9$ | 0.49 | 1.30 | 1.10 |

[1]Contains vinylbenzyl chloride instead of styrene

EXAMPLE 52

An integral-negative-receiving element for use in an image transfer film unit was prepared by coating a poly(ethylene terephthalate) film support with the following hardened layers. The concentrations of the components are parenthesized and represent grams per meter².

Layer 1

An image receiving layer containing gelatin (200) and poly(styrene-co-divinylbenzylchloride-co-N-benzyl-N,N-dimethyl-N-vinylbenzylammonium chloride-co-divinylbenzene as in Example 1 (2.2).

Layer 2

A white, reflecting layer containing titanium dioxide pigment (22) and gelatin (2.2).

Layer 3

A black pigmented opaque layer containing carbon (2.6) and gelatin (1.7).

Layer 4

Cyan dye-releasing redox compound having the formula

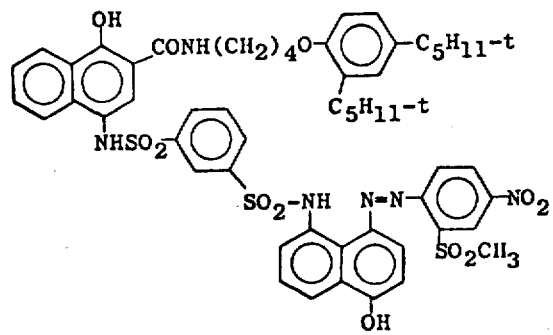

(0.54) dispersed in gelatin (0.75).

Layer 5

Red-sensitive internal-image gelatino silver chlorobromoiodide emulsion (0.97Ag, 0.86 gel); nucleating agent 1-acetyl2-{p-[5-amino-2-(2,4-di-tert-pentylphenoxy)benzamido]phenyl}hydrazine (8gms per mole Ag) and 2-(2-octadecyl)sulfohydroquinone potassium salt (8 gms per mole Ag).

Layer 6

Developer scavenging interlayer of di-sec-dodecylhydroquinone (0.75) dispersed in gelatin (0.68).

Layer 7

Magenta dye-releasing redox compound

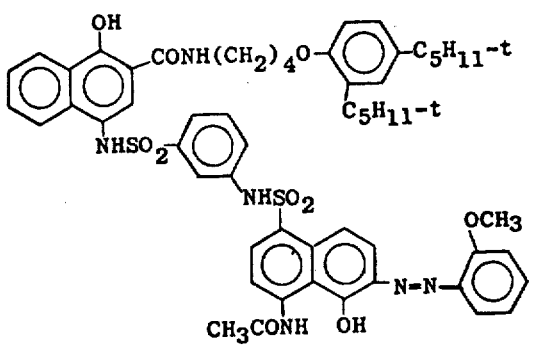

(0.97) dispersed in gelatin (1.1)

Layer 8

Green-sensitive internal-image, gelatin-silver chlorobromide emulsion (0.97Ag, 0.86 gel); nucleating agent aceto-2-{p-[5-amino-2-(2,4-di-tert-pentylphenoxy)benzamido]phenyl}hydrazine (4gms per mole Ag) and 2-(2-octadecyl)-5-sulfohydroquinone potassium salt (16 gms per mole Ag).

Layer 9

Developer scavenging interlayer like layer (6).

Layer 10

Yellow dye-releasing redox compound

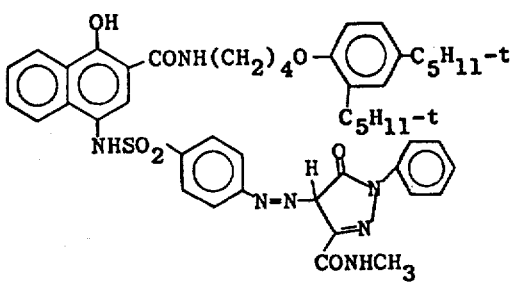

(1.1) dispersed in gelatin (1.1).

Layer 11

Blue-sensitive internal-image, gelatin-silver chlorobromoiodide emulsion (0.97Ag), 0.86 gel); 2-(2-octadecyl)-5-sulfohydroquinone potassium salt (8gms per mole Ag and nucleating agent aceto-2- p-[5-amino-2-(2,4-di-tert-pentylphenoxy)benzamido]-phenyl hydrazine (8gms per mole Ag).

Layer 12

Overcoat layer containing gelatin (5.4).

The above element was exposed to a graduated density multicolor test object. The processing composition is employed in a pod and spread between the surface of the above element and a cover sheet by passing the transfer sandwich between a pair of juxtaposed pressure rollers. The cover sheet comprises the following layers coated on a poly(ethylene terephthalate) film support:

1. An acid layer of polyacrylic acid (150)
2. A timing layer containing cellulose acetate (41).

The processing was carried out at 24°C (75°F) employing the following composition:

| | |
|---|---|
| Potassium hydroxide | 56.0 g |
| 4-Hydroxymethyl-4-methyl-1-phenyl-3-pyrazolidinone | 8.0 g |
| Sodium sulfite | 2.0 g |
| Carbon | 40.0 g |
| 5-Methylbenzotriazole | 2.4 g |
| t-Butylhydroquinone | 0.2 g |
| Hydroxyethyl cellulose | 25.0 g |
| Water to make | 1.0 l. |

A well defined, multicolor reproduction of the test object was observed in the image receiving layer (Layer 1) when viewed through the transparent support.

This invention has been described in detail with particular reference to preferred embodiments thereof, but it will be understood that variations and modifications can be effected within the spirit and scope of the invention.

We claim:

1. A dye mordant composition containing a water-dispersible polymer comprising units according to the formula:

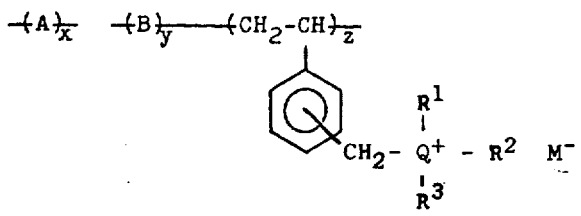

wherein A represents units of an addition polymerizable monomer containing at least two ethenically unsaturated groups;

B represents units of a copolymerizable $\alpha,\beta$-ethylenically unsaturated monomer;

Q is N or P;

$R^1$, $R^2$ and $R^3$ are independently selected from the group consisting of carbocyclic and alkyl groups;

$M^-$ is an anion;

$x$ is from about 0.25 to about 5 mole percent;

$y$ is from about 0 to about 90 mole percent; and $z$ is from about 10 to about 99 mole percent.

2. The dye mordant composition of claim 1 wherein $x$ is from about 1.0 to 5.0 mole percent, $y$ is 0 to 45 mole percent and $z$ is 40 to 99 mole percent.

3. The dye mordant composition of claim 1 wherein Q is N.

4. The dye mordant composition of claim 1 wherein A is a unit of divinylbenzene monomer.

5. The dye mordant composition of claim 1 wherein $R^1$, $R^2$ and $R^3$ are independently selected from the group consisting of alkyl and aralkyl.

6. The dye mordant composition of claim 1 wherein $R^1$, $R^2$ and $R^3$ are each hexyl.

7. The dye mordant composition of claim 1 wherein $R^1$ and $R^2$ are methyl and $R^3$ is benzyl.

8. The dye mordant composition of claim 1 wherein $M^-$ is sulfate.

9. The dye mordant composition of claim 1 wherein $M^-$ is $Cl^-$.

10. The dye mordant composition of claim 1 wherein B is a repeating unit of styrene.

11. A dye mordant composition comprising a water-dispersible polymer comprising units according to the formula:

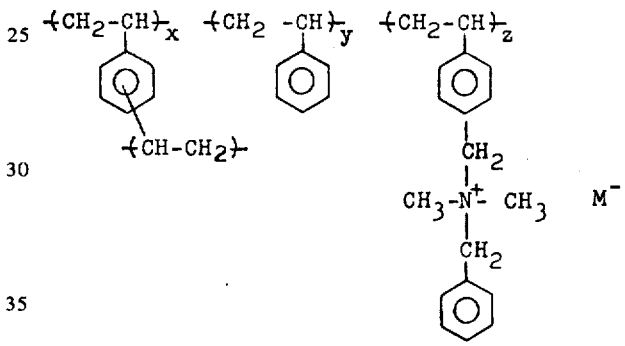

wherein $m^-$ is an anion;

$x$ is from about 0.25 to about 5.0 mole percent;

$y$ is from about 0 to about 90 mole percent; and $z$ is from about 10 to about 99 mole percent.

12. The process of preparing a photographic element comprising a support and at least one layer comprising a dye mordant and at least one layer comprising an acid dye or acid dye precursor said process comprising providing the dye mordant layer by coating on a support a substantially aqueous dispersion of a polymer comprising units according to the formula;

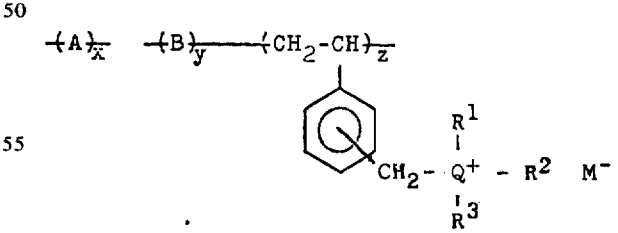

wherein A represents units of a monomer containing at least two ethylenically unsaturated groups;

B represents units of a copolymerizable $\alpha,\beta$-ethylenically unsaturated monomer;

Q is N or P;

$R^1$, $R^2$ and $R^3$ are independently selected from the group consisting of carbocyclic and alkyl;

$M^-$ is an anion;

$x$ is from about 0.25 to about 5 mole percent;

$y$ is from about 0 to about 90 mole percent; and
$z$ is from about 10 to about 99 mole percent
and applying the layer or layers containing acid dyes or acid dye precursors.

13. The process of claim 12 wherein the substantially aqueous solution of polymer comprises less than 10% by weight of non-aqueous solvent.

14. The process of claim 12 wherein $x$ is from 1.0 to 5.0 mole percent, $y$ is from 0 to 45 mole percent, and $z$ is 40 to 99 mole percent.

15. The process of claim 12 wherein Q is N.

16. The process of claim 12 wherein A is a unit of divinylbenzene monomer.

17. The process of claim 12 wherein $R^1$, $R^2$ and $R^3$ are each hexyl.

18. The process of claim 12 wherein $R^1$ and $R^2$ are methyl and $R^3$ is benzyl.

19. The process of claim 12 wherein $R^1$, $R^2$ and $R^3$ are each alkyl or aralkyl.

20. The process of preparing a photographic element comprising a support and at least one layer comprising a dye mordant and at least one layer comprising an acid dye or acid dye precursor comprising coating the support with a substantially aqueous dispersion of a polymer comprising units represented by the formula:

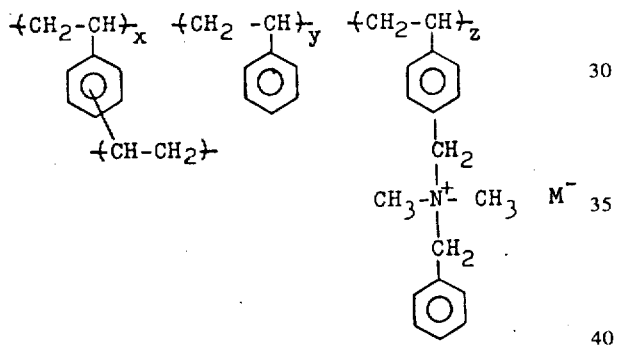

wherein
$M^-$ is an anion;
$x$ is from about 0.25 to about 5.0 mole percent;
$y$ is from about 0 to about 90 mole percent; and
$z$ is from about 10 to about 99 mole percent;
and applying the layer or layers containing acid dyes or acid dye precursors.

21. A photographic element comprising a support, at least one layer containing a dye mordant, and at least one layer containing an acid dye or acid dye precursor wherein the layer containing the dye mordant comprises a polymer comprising units represented by the formula:

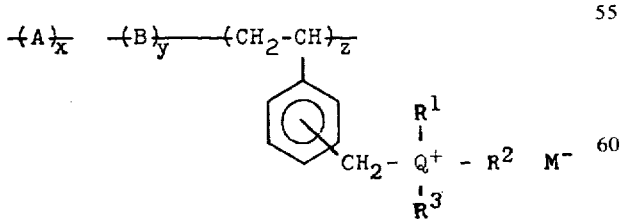

wherein A is a polymerized monomer containing at least two ethylenically unsaturated groups;
B is a polymerized compolymerizable $\alpha,\beta$-ethylenically unsaturated monomer;
Q is N or P;
$R^1$, $R^2$ and $R^3$ are independently selected from the group consisting of carbocylic and alkyl;
$M^-$ is an anion;
$x$ is from about 0.25 to about 5 mole percent;
$y$ is from about 0 to about 90 mole percent; and
$z$ if from about 10 to about 99 mole percent.

22. The photographic element of claim 21 wherein $x$ is from 1.0 to 5.0 mole percent, $y$ is from 0 to 45 mole percent and $z$ is 40 to 99 mole percent.

23. The photographic element of claim 21 wherein Q is N.

24. The photographic element of claim 21 wherein A is a unit of divinylbenzene monomer.

25. The photographic element of claim 21 wherein $R^1$, $R^2$ and $R^3$ are each hexyl.

26. The photographic element of claim 21 wherein $R^1$, $R^2$ and $R^3$ are each alkyl or aralkyl.

27. A photographic element comprising a support at least one layer containing a dye mordant and at least one layer containing an acid dye or an acid dye precursor wherein the layer containing a dye mordant comprises a polymer comprising units represented by the formula:

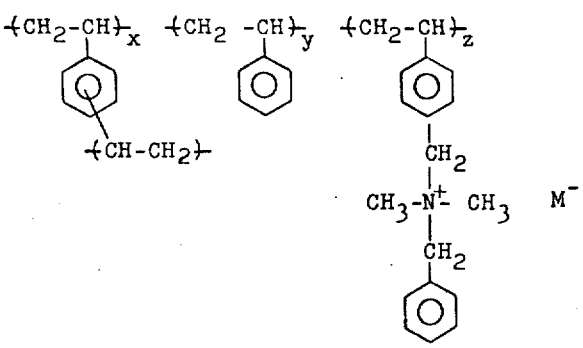

wherein
$M^-$ is an anion;
$x$ is from about 0.25 to about 5.0 mole percent;
$y$ is from about 0 to about 90 mole percent; and
$z$ is from about 10 to about 99 mole percent.

28. A dye image receiving element comprising a support having thereon a dye mordant layer which comprises a polymer comprising units represented by the formula:

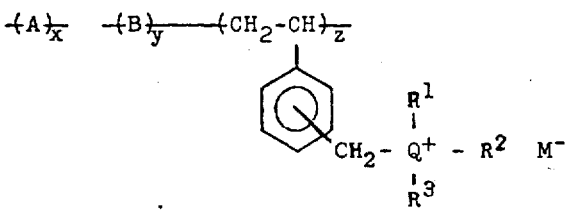

wherein A is a polymerized monomer containing at least two ethylenically unsaturated groups;
B is a polymerized copolymerizable $\alpha,\beta$-ethylenically unsaturated monomer;
Q is N or P;
$R^1$, $R^2$ and $R^3$ are independently selected from the group consisting of carbocyclic and alkyl;
$M^-$ is an anion;
$x$ is from about 0.25 to about 5.0 mole percent;
$y$ is from about 0 to about 90 mole percent; and
$z$ is from about 10 to about 99 mole percent.

29. The dye image receiving element of claim 28 wherein x is 1.0 to 5.0 mole percent, y is 0 to 45 mole percent and z is 40 to 99 mole percent.

30. The dye image receiving element of claim 28 wherein Q is N.

31. The dye image receiving element of claim 28 wherein A is a unit of divinylbenzene monomer.

32. The dye image receiving element of claim 28 wherein $R^1$, $R^2$ and $R^3$ are each hexyl.

33. The dye image receiving element of claim 28 wherein $R^1$, $R^2$ and $R^3$ are each alkyl or aralkyl.

34. A dye image receiving element comprising a support having thereon a dye mordant layer which comprises a polymer comprising units represented by the formula:

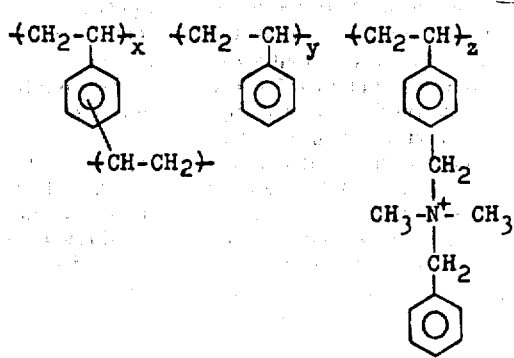

wherein
M⁻ is an anion;
x is from about 0.25 to about 5.0 mole percent;
y is from about 0 to about 90 mole percent; and
z is from about 10 to about 99 mole percent.

35. A process of forming a dye image receiving element comprising a support having thereon a dye mordant layer comprising coating said support with a substantially aqueous dispersion of a polymer comprising units represented by the formula:

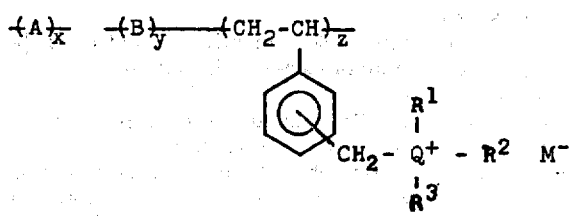

wherein A is a polymerized monomer containing at least two ethylenically unsaturated groups;
B is a polymerized copolymerizable α,β-ethylenically unsaturated monomer;
Q is N or P;
$R^1$, $R^2$ and $R^3$ are independently selected from the group consisting of carbocyclic and alkyl;
M⁻ is an anion;
x is from about 0.25 to about 5.0 mole percent;
y is from about 0 to about 90 mole percent; and
z is from about 10 to about 99 mole percent.

36. A process of forming a dye image receiving element comprising a support having thereon a dye mordant layer comprising coating said support with a substantially aqueous dispersion of a polymer comprising units represented by the formula:

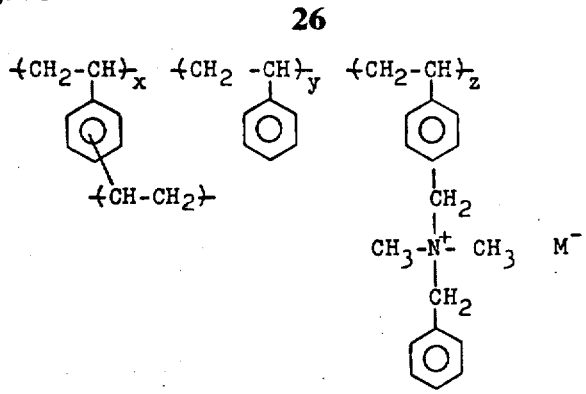

wherein
M⁻ is an anion;
x is from about 0.25 to about 5.0 mole percent;
y is from about 0 to about 90 mole percent; and
z is from about 10 to about 99 mole percent.

37. An integral-negative-receiver photographic image transfer element comprising a support and at least one layer thereon containing at least one photographic silver halide emulsion layer having associated therewith an image dye providing material and at least one layer thereon containing a polymer comprising units represented by the formula:

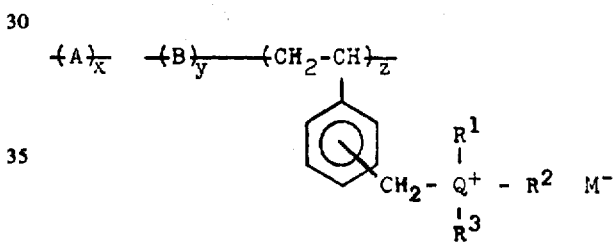

wherein
A is a polymerized monomer containing at least two ethylenically unsaturated groups;
B is a polymerized copolymerizable α,β-ethylenically unsaturated monomer;
Q is N or P;
$R^1$, $R^2$ and $R^3$ are independently selected from the group consisting of carbocyclic and alkyl;
M⁻ is an anion;
x is from about 0.25 to about 5.0 mole percent;
y is from about 0 to about 90 mole percent; and
z is from about 10 to about 99 mole percent having contiguous thereto a dye image providing material.

38. The integral negative receiver element of claim 37 wherein x is from about 1.0 to 5.0 mole percent; y is from 0 to 45 mole percent and z is 40 to 99 mole percent.

39. The integral negative receiver element of claim 37 wherein Q is N.

40. The integral negative receiver element of claim 37 wherein A is a unit of divinylbenzene monomer.

41. The integral negative receiver element of claim 37 wherein $R^1$, $R^2$ and $R^3$ are each hexyl.

42. The integral negative receiver element of claim 37 wherein $R^1$, $R^2$ and $R^3$ are each alkyl or aralkyl.

43. The integral-negative-receiver element of claim 37 wherein the polymer comprises units represented by the formula:

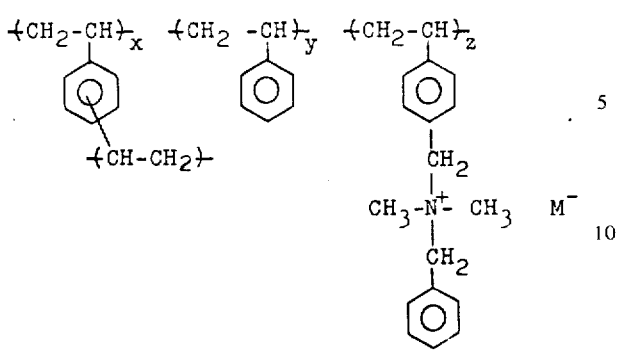

wherein
M⁻ is an anion;
$x$ is from about 0.25 to about 5.0 mole percent;
$y$ is from about 0 to about 90 mole percent; and
$z$ is from about 10 to about 99 mole percent.

44. A process of preparing an integral negative receiver comprising a support and at least one layer thereon containing at least one photographic silver halide emulsion layer and at least one layer thereon containing a dye mordant, said process comprising applying said silver halide emulsion and dye mordant each as a substantially aqueous dispersion and wherein the dye mordant is a polymer comprising units represented by the formula:

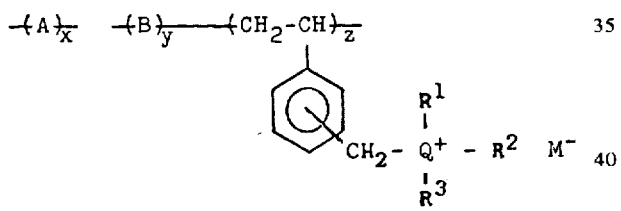

wherein A is a polymerized monomer containing at least two ethylenically unsaturated groups;
B is a polymerized copolymerizable α,β-ethylenically unsaturated monomer;
Q is N or P;
R¹, R² and R³ are independently selected from the group consisting of carbocyclic and alkyl;
M⁻ is an anion;
$x$ is from about 0.25 to about 5.0 mole percent;
$y$ is from about 0 to about 90 mole percent; and
$z$ is from about 10 to about 99 mole percent.

45. The process of claim 44 wherein the substantially aqueous solution of polymer comprises less than 10% by weight of non-aqueous solvent.

46. The process of claim 44 wherein R¹, R² and R³ are alkyl or aralkyl.

47. A process of preparing an integral-negative-receiver comprising a support and at least one layer containing at least one photographic silver halide emulsion layer and at least one layer containing a dye mordant said process comprising applying the silver halide emulsion and dye mordant as a substantially aqueous dispersion and the dye mordant is a polymer comprising units represented by the formula:

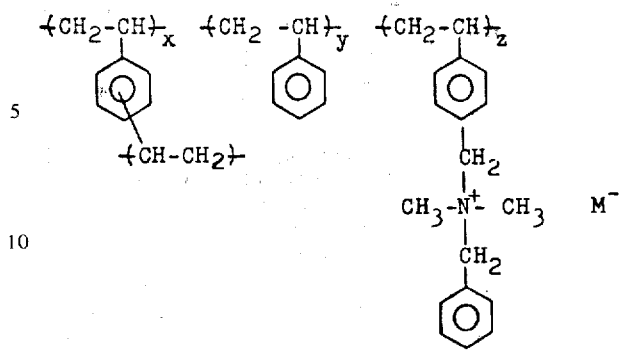

wherein
M⁻ is an anion;
$x$ is from about 0.25 to about 5.0 mole percent;
$y$ is from about 0 to about 90 mole percent; and
$z$ is from about 10 to about 99 mole percent.

48. The process of claim 47 wherein the substantially aqueous solution of polymer comprises less than 10% by weight of non-aqueous solvent.

49. An image transfer element comprising (a) a support having thereon at least one photographic silver halide emulsion layer having associated therewith an immobile image dye-providing material which releases an anionic sulfonamide dye as a function of oxidation, (b) a dye image-receiving layer containing a polymer having units represented by the formula:

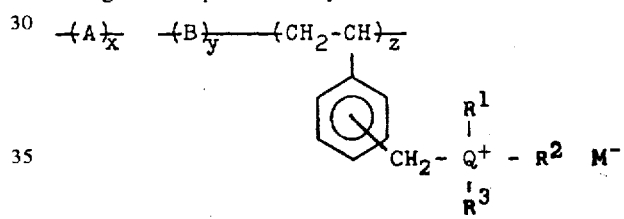

wherein
A represnets units of an addition polymerizable monomer containing at least two vinyl groups;
B represents units of a copolymerizable α,β-ethylenically unsaturated monomer;
Q is N or P;
R¹, R² and R³ are independently selected from the group consisting of carbocyclic and alkyl;
M⁻ is an anion;
$x$ is from about 0.25 to about 5.0 mole percent;
$y$ is from about 0 to about 90mole percent; and
$z$ is from about 10 to about 99 mole percent; and (c) means containing an alkaline processing composition adapted to discharge its contents within said element, said element containing a silver halide developing agent.

50. The element of claim 49 wherein (a) said dye image-receiving layer is located between said support and said silver halide emulsion layer; (b) an opaque layer is located between said dye image-receiving layer and said silver halide emulsion layer and a reflecting layer is located between the opaque layer and image receiving layer; (c) said element also includes a transparent sheet superposed on the layer outermost from the support; and (d) said discharging means is a rupturable container containing said alkaline processing composition and an opacifying agent, said container being so positioned during processing of said element that a compression force applied to said container will effect a discharge of the container's contents between said transparent sheet and the outermost layer from the support of said element.

* * * * *